Oct. 5, 1948.  D. H. CLARK  2,450,749
GARDEN TRACTOR

Filed Oct. 9, 1944  2 Sheets-Sheet 1

Inventor
D. H. Clark
Attorneys

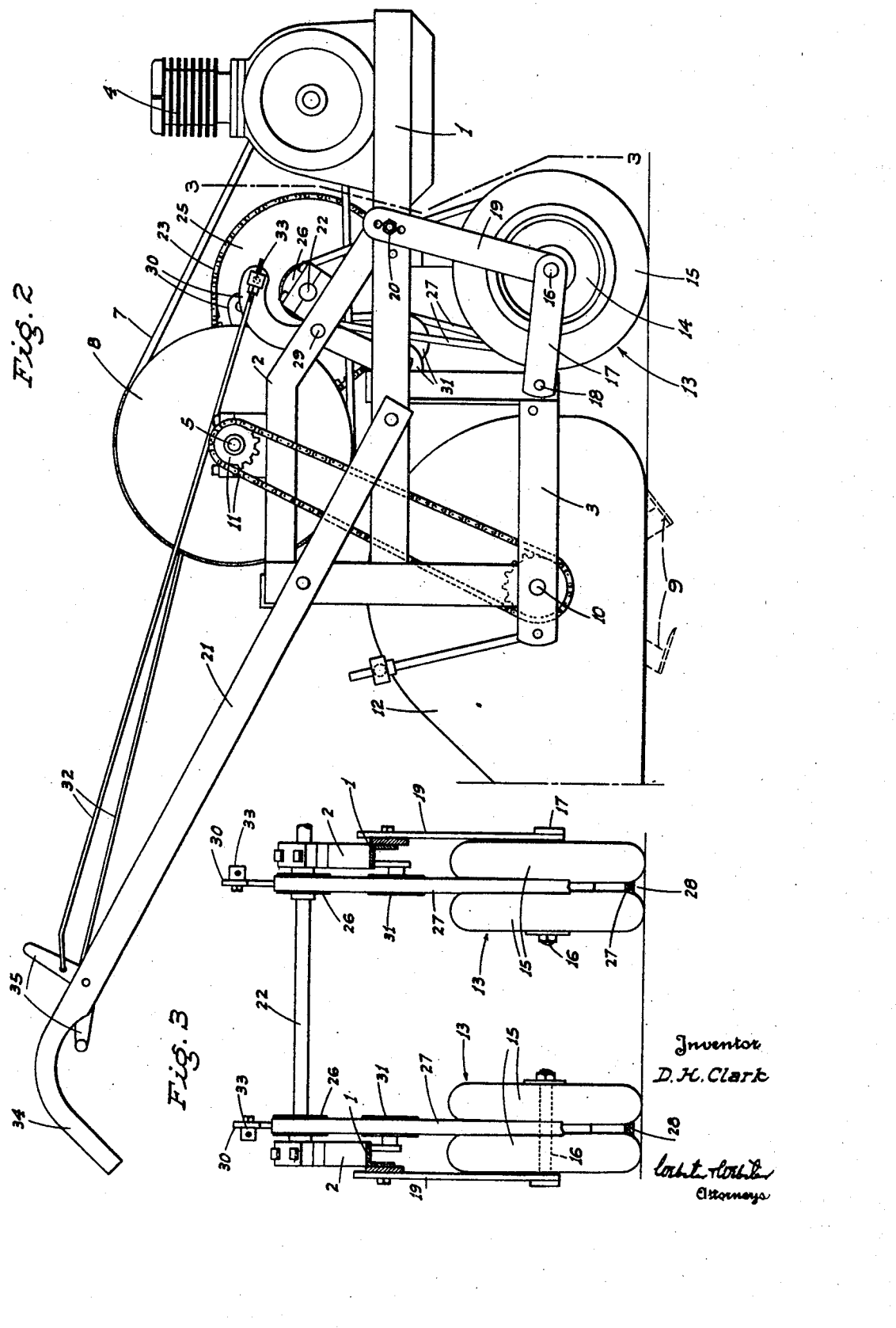

Patented Oct. 5, 1948

2,450,749

UNITED STATES PATENT OFFICE 2,450,749

GARDEN TRACTOR

Donald H. Clark, Stockton, Calif.

Application October 9, 1944, Serial No. 557,867

5 Claims. (Cl. 180—17)

This invention relates in general to improvements in a garden tractor of the type controlled by an operator walking behind the implement, and in particular the invention is directed to, and it is an object to provide, a novel drive mechanism for a tractor of the type described.

A further object of the invention is to embody, in a garden tractor which includes transversely spaced dual wheel units, each of which includes adjacent rubber tires, a pair of endless V-drive belts running in driving relation between alined drive pulleys and corresponding dual wheel units; the V-belts frictionally engaging between the tires of the corresponding unit in the annular channel formed by the rounded tread surfaces of said tires.

Another object of the present invention is to provide a drive mechanism, as in the preceding paragraph, including operator controlled means arranged so that the respective belts can be simultaneously or selectively driven whereby when selectively driven positive power steering of the tractor is accomplished.

Another object is to arrange the parts of the tractor so that the rotary cultivator unit or spinner is well balanced, which makes for ease of operation and turning of the implement with a minimum of operator fatigue.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a similar view, but taken from the opposite side of the tractor.

Figure 3 is a cross section on line 3—3 of Fig. 2.

Figure 1:
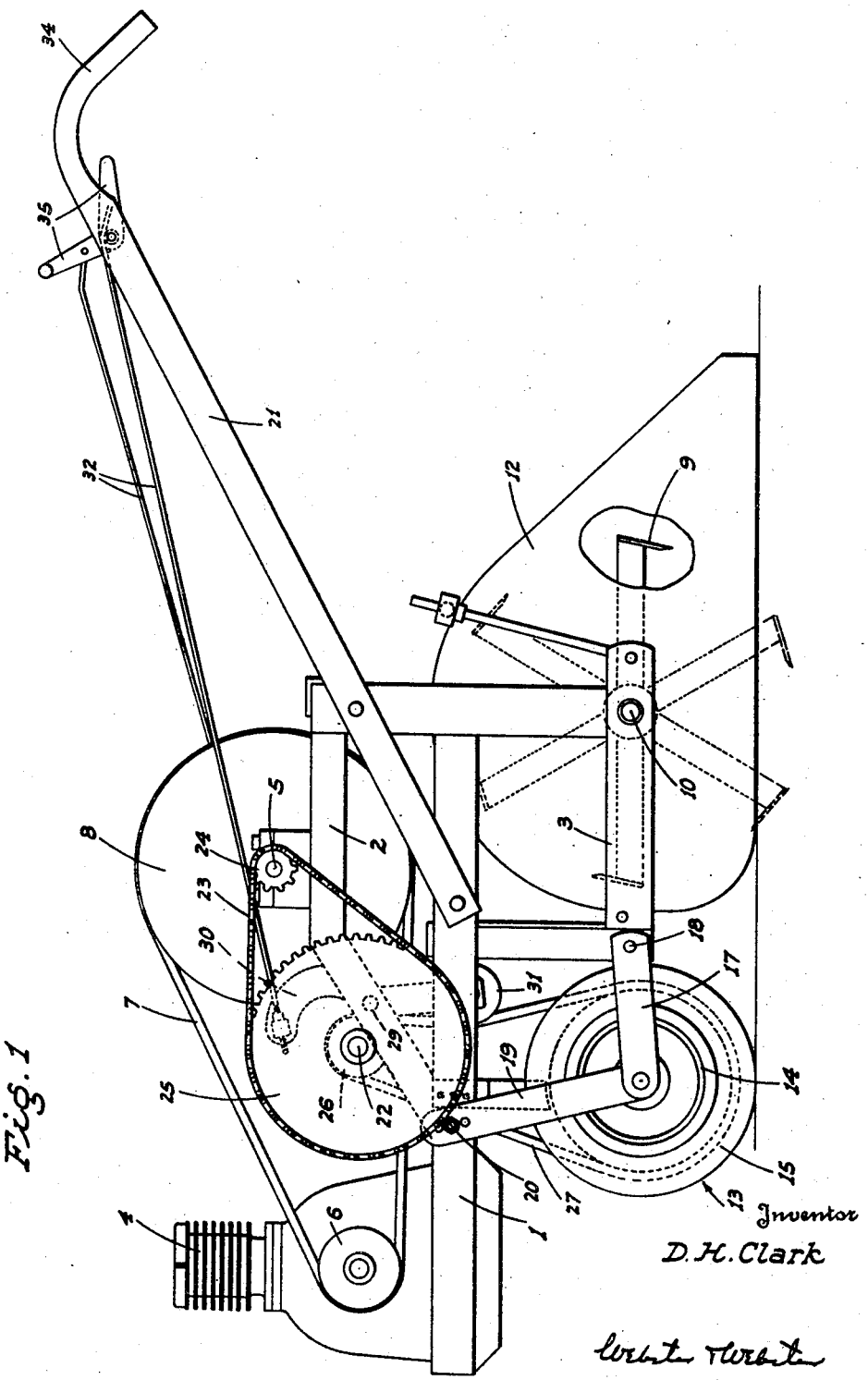
Figure 1 is a side elevation of the tractor.

Referring now more particularly to the characters of reference on the drawings, the tractor comprises an elongated horizontal main frame 1 which includes upstanding side frames 2 and depending side frames 3; the side frames 2 and 3 being disposed rearwardly of the forward end portion of the main frame.

At said forward end portion of the main frame the same supports a small gasoline engine, indicated generally at 4 which drives a horizontal cross shaft 5 through the medium of an engine pulley 6, an endless belt 7, and a large diameter pulley 8 on said shaft 5; the latter being supported in journaled relation from the upstanding side frames 2.

In the garden tractor here illustrated the ground working means comprises a rotary cultivator or spinner, indicated generally at 9, which is fixed on a cross shaft 10 journaled between the lower and rear end portion of the depending side frames 3; the cross shaft 10 being driven from the cross shaft 5 by a sprocket endless chain arrangement, indicated generally at 11. The spinner 9 is enclosed within a protective hood 12.

The implement is supported from the ground at a point directly ahead of the hood 12 by means of transversely spaced dual wheel units, indicated generally at 13, and each of which units comprises a small-diameter wheel 14 which carries a pneumatic tire 15; the tires of each dual wheel unit being disposed in adjacent but slightly spaced relation. Each of the dual wheel units 13 is carried on a spindle 16 which projects laterally inwardly from the forward end of a corresponding, longitudinally extending draft link 17 which is pivotally connected at its rear end, as at 18, to the corresponding depending side frame 3 adjacent the bottom and at the front of the latter.

A further support for each dual wheel unit 13 comprises an adjustment link 19 pivoted in connection with the corresponding draft link 17 at the forward end of the latter and thence extending upwardly at a slight forward incline to vertically adjustable connection, as at 20, with the adjacent side of the main frame 1.

A pair of transversely spaced handles 21 are fixed in connection with the frame of the implement adjacent the rear thereof and extend upwardly and rearwardly for hand engagement by the operator who walks behind the implement.

The dual wheel units 13 are driven from the engine 4 by means of the following arrangement:

Another cross shaft 22 is journaled in connection with the upstanding side frames 2 ahead of the cross shaft 5 and is driven from the latter at reduced speed through the medium of an endless chain 23 which extends between a small sprocket 24 on shaft 5 and a large sprocket 25 on shaft 22.

A pair of transversely spaced pulleys 26 are fixed on shaft 22 in vertically and centrally alined relation to corresponding dual wheel units 13. An endless belt 27 engages at its upper end in each of the pulleys 26, while the lower end of each such belt engages in an annular channel 28 which is generally V-shaped in cross section formed between the rounded tread portions of the tires 15 of the corresponding dual wheel unit 13. The adjustment links 19 are set so that the belts are normally sufficiently slack that said belts are ineffective to drive the dual wheels units 13.

A cross rod 29 extends between the upstanding side frames 2 slightly to the rear of the pulleys 26, and said rod is fitted with a pair of swingable bellcranks 30 which carry, at their lower end, belt tightening rollers 31; the bellcranks 30 being positioned so that the corresponding rollers 31 are disposed to ride against the rearmost run of the endless belts 27.

Above the rod 29 the upper legs of the bellcranks 30 curve forwardly and control rods 32 are connected at their forward ends with the upper ends of said bellcranks, as at 33. The rods 32 extend rearwardly and upwardly to adjacent the hand grips 34 of handles 21 and there connect with corresponding control levers 35. The control levers 35 are arranged to swing from an upstanding position to a lowered and a locked position beyond dead center. In the present illustration one of such control levers 35 is shown in upstanding released position, while the other is shown in lowered and locked position.

When the control levers 35 are in lowered and locked position the rollers 31 are swung forwardly into belt-tightening engagement with the corresponding endless belts 27, causing said belts to drive the dual wheel units 13.

It will be seen that when both belts 27 are tightened the tractor will be positively driven in a forward direction and as such tractor progresses down a row any slight steering which may be necessary can be accomplished by the operator by manipulating the handles 21. However, at the end of each row, or at any other time when a substantial turn of the implement is desired, the operator moves one or the other of the control levers 35 from locked to released position. When this occurs the corresponding belt 27 is released, discontinuing the drive to the corresponding dual wheel unit 13. As the other dual wheel unit continues to drive, an effective and positive turning movement of the implement then results. After the turning movement is accomplished both the control levers 35 are returned to locked position, whereupon the implement drives forwardly without tendency to turn.

By the employment of the unique driving arrangement which includes the endless V-belts 27 driving through the medium of the tires of the dual wheel units 13, a simplified and yet extremely effective drive is accomplished without the necessity of employing mechanical means, such as drive chains, drive gears, or the like, in conjunction with friction clutches or differentials, which are conventionally used.

It will be noted that the wheel units about which the frame may tilt, are disposed between the spinner and the engine; the weight of these and associated parts being so distributed relative to the wheel axis as to substantially balance the tractor about said axis. This makes for very easy operation and control of the tractor with a minimum of fatigue, as will be evident.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a garden tractor which includes a frame supporting an engine, transversely spaced wheel units disposed beneath the frame, the frame including a depending portion rearwardly of the wheel units, a rigid draft member fixed in connection with each wheel unit and extending rearwardly to connect with said depending frame portion, another rigid member fixed in connection with each wheel unit adjacent the forward end of the corresponding draft member and extending upwardly to connect with the frame above the wheel units, and means to drive said wheel units from the engine.

2. In a garden tractor which includes a frame supporting an engine, transversely spaced wheel units disposed beneath the frame, the frame including a depending portion rearwardly of the wheel units, a rigid draft member fixed in connection with each wheel unit and extending rearwardly to connect with said depending frame portion, another rigid member fixed in connection with each wheel unit adjacent the forward end of the corresponding draft member and extending upwardly to connect with the frame above the wheel units, and means to drive said wheel units from the engine; each draft member being pivoted on said depending frame portion for vertical swinging movement, and each corresponding other member being vertically adjustably connected to the frame.

3. A tractor comprising a frame and a ground engaging supporting and propelling means, such latter means including a supporting wheel unit which consists of a pair of wheels, means for suspending said wheels from the frame and for rotation relative thereto, a tire on each wheel, the wheels being relatively closely spaced apart and adjacent side walls of the tires sloping divergently in the direction of their ground engaging tread to form a channel defined by said sloping side walls, a rotatable cross shaft journaled on the frame in substantial parallelism with the axis of the wheel unit, a pulley on the shaft in substantial alinement with said channel, an endless friction type drive belt encompassing the pulley and channel and operable to be brought into frictional driving relation with the diverging walls of the channel, and means on the tractor to drive the shaft.

4. A tractor as in claim 3 in which the wheel tires are of the inflatable pneumatic type.

5. A combination as in claim 3 in which there are two of said driven wheel and driving belt assemblies, each independent of the other and which are spaced apart transversely of the direction of travel of the tractor, and independent means for selectively bringing each belt into or releasing it from frictional contact with the side walls of the channel in the corresponding wheel unit.

DONALD H. CLARK.

REFERENCES CITED

The following references are of record in the file of this patent:

UNITED STATES PATENTS

| Number | Name | Date |
| --- | --- | --- |
| 1,276,949 | Olson | Aug. 27, 1918 |
| 1,641,158 | Donald | Sept. 6, 1927 |
| 1,833,053 | McManus | Nov. 24, 1931 |
| 2,133,512 | Herge | Oct. 18, 1938 |
| 2,176,261 | Kelsey | Oct. 17, 1939 |
| 2,258,778 | Lewis | Oct. 14, 1941 |
| 2,329,372 | Hitch | Sept. 14, 1943 |
| 2,367,466 | Loy | Jan. 16, 1945 |
| 2,401,796 | Raitch | June 11, 1946 |